United States Patent
Hayakawa

(10) Patent No.: US 11,403,160 B2
(45) Date of Patent: Aug. 2, 2022

(54) FAULT PREDICTING SYSTEM AND FAULT PREDICTION METHOD

(71) Applicant: Hitachi, Ltd., Tokyo (JP)

(72) Inventor: Miki Hayakawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/959,630

(22) PCT Filed: Jan. 19, 2018

(86) PCT No.: PCT/JP2018/001648
§ 371 (c)(1),
(2) Date: Jul. 1, 2020

(87) PCT Pub. No.: WO2019/142331
PCT Pub. Date: Jul. 25, 2019

(65) Prior Publication Data
US 2020/0371858 A1    Nov. 26, 2020

(51) Int. Cl.
*G06F 11/00* (2006.01)
*G06F 11/07* (2006.01)
*G06N 20/00* (2019.01)

(52) U.S. Cl.
CPC ...... *G06F 11/0766* (2013.01); *G06F 11/0706* (2013.01); *G06F 11/0757* (2013.01); *G06F 11/0793* (2013.01); *G06N 20/00* (2019.01)

(58) Field of Classification Search
CPC ............. G06F 11/0793; G06F 11/0757; G06F 11/0706; G06F 11/0766; G06F 11/008;
(Continued)

(56) References Cited

U.S. PATENT DOCUMENTS 8,751,195 B2 * 6/2014 Chen ................. G05B 23/0283
                                                      702/179
9,395,707 B2 * 7/2016 Anderson ............... G06F 30/20
(Continued)

FOREIGN PATENT DOCUMENTS

JP    2009-86896 A    4/2009
JP    2009-128636 A   6/2009
(Continued)

OTHER PUBLICATIONS

International Search Report (PCT/ISA/210) issued in PCT Application No. PCT/JP2018/001648 dated Mar. 6, 2018 with English translation (three pages).
(Continued)

*Primary Examiner* — Loan L. T. Truong
(74) *Attorney, Agent, or Firm* — Crowell & Moring LLP

(57) ABSTRACT

A reference time point which is equivalent to a fault-prediction-execution time point is sequentially changed by setting, as a symptom sensing period, a period from a time point which is a predetermined first period-length before the reference time point until the reference time point, and by setting, as a prediction target period, a period from the reference time point until a time point which is a predetermined second period-length after the reference time point if a fault does not occur in the period from the reference time point until the time point which is the second period-length after the reference time point, and a period from the reference time point until a fault-occurrence time point if a fault occurs in the period from the reference time point until the time point which is the second period-length after the reference time point, and machine learning is performed by using, as an explanatory variable, a feature quantity based on the operation log information of the symptom sensing period, and using, as a response variable, a fault index value based on whether or not there is a particular-event occur-
(Continued)

rence in the operation log information corresponding to a fault occurrence in the fault record information of the prediction target period, and a period-length from the reference time point until the fault-occurrence time point.

17 Claims, 17 Drawing Sheets

(58) Field of Classification Search
CPC ............. G06F 11/0754; G06F 11/3452; G06F 11/004; G06F 11/0772; G06F 11/076; H04L 41/147; H04L 41/142; H04L 41/5009; H04L 43/08; H04L 41/5025; G06N 20/00; G05B 2219/32201; G05B 23/0243
See application file for complete search history.

(56) References Cited

U.S. PATENT DOCUMENTS

| | | | |
|---|---|---|---|
| 9,542,296 B1* | 1/2017 | Engers | G06F 11/2033 |
| 10,048,996 B1* | 8/2018 | Bell | G06F 11/3006 |
| 10,216,558 B1* | 2/2019 | Gaber | G06F 11/0727 |
| 10,261,850 B2* | 4/2019 | Nicholas | G06F 11/0793 |
| 10,901,832 B2* | 1/2021 | Farahat | G06Q 30/0283 |
| 2008/0059120 A1* | 3/2008 | Xiao | G06F 11/0748 |
| | | | 702/184 |
| 2008/0250265 A1* | 10/2008 | Chang | G06F 11/0709 |
| | | | 714/4.12 |
| 2009/0033993 A1 | 2/2009 | Nakazato et al. | |
| 2010/0225961 A1 | 9/2010 | Matsuda et al. | |
| 2010/0333089 A1* | 12/2010 | Talwar | G06F 9/45558 |
| | | | 718/1 |
| 2012/0191439 A1* | 7/2012 | Meagher | G06F 30/20 |
| | | | 703/18 |
| 2015/0195192 A1* | 7/2015 | Vasseur | G06F 11/2007 |
| | | | 714/47.3 |
| 2015/0227838 A1* | 8/2015 | Wang | G06N 7/00 |
| | | | 706/12 |
| 2016/0261468 A1* | 9/2016 | Premkumar | H04L 41/0681 |
| 2017/0286854 A1* | 10/2017 | Ardis | G06F 11/3447 |
| 2018/0352025 A1* | 12/2018 | Anya | H04L 41/147 |
| 2019/0068467 A1* | 2/2019 | Chauhan | H04L 41/142 |
| 2019/0095313 A1* | 3/2019 | Xu | G06F 11/008 |
| 2020/0005399 A1* | 1/2020 | Takamatsu | G06N 5/04 |
| 2020/0026590 A1* | 1/2020 | Lopez | G05B 23/0243 |

FOREIGN PATENT DOCUMENTS

| | | |
|---|---|---|
| JP | 2010-206496 A | 9/2010 |
| JP | 2015-174256 A | 10/2015 |

OTHER PUBLICATIONS

Japanese-language Written Opinion (PCT/ISA/237) issued in PCT Application No. PCT/JP2018/001648 dated Mar. 6, 2018 (three pages).

* cited by examiner

FIG. 3

| EQUIPMENT ID | DATE/TIME | PARTICULAR-EVENT OCCURRENCE COUNT | | | | SENSOR VALUE | | | | APPARATUS OPERATION HISTORY | | | | SETTING PARAMETER | | |
|---|---|---|---|---|---|---|---|---|---|---|---|---|---|---|---|---|
| | | EVENT A | EVENT B | ... | EVENT n | S1 | S2 | ... | Sn | OPERATION 1 | OPERATION 2 | ... | OPERATION n | SETTING 1 | SETTING 2 | ... | SETTING n |
| 10001045 | 2017/10/01 12:34:00 | 2 | 0 | .. | 0 | 49 | 0.2 | .. | 0 | 0 | 0 | .. | 1 | 5E | FF | .. | 00 |
| 10001045 | 2017/10/01 12:35:00 | 0 | 0 | .. | 0 | 33 | 0.1 | .. | 0 | 0 | 0 | .. | 1 | 5E | FF | .. | 00 |
| 10001045 | 2017/10/01 12:36:00 | 1 | 1 | .. | 0 | 55 | 1.1 | .. | 1 | 0 | 2 | .. | 0 | 1E | FF | .. | 01 |
| 10001045 | 2017/10/01 12:37:00 | 0 | 0 | .. | 0 | 82 | 4.5 | .. | 1 | 0 | 1 | .. | 0 | 1E | FF | .. | 01 |
| .. | .. | .. | .. | .. | .. | .. | .. | .. | .. | .. | .. | .. | .. | .. | .. | .. | .. |

| 501 | 502 | 503 | 504 | 505 | 506 |
|---|---|---|---|---|---|
| EQUIPMENT ID | FAULT-OCCURRENCE DATE/TIME | MAINTENANCE-IMPLEMENTATION DATE/TIME | MAINTENANCE TARGET | MAINTENANCE CONTENT | SYMBOL |
| 10001045 | 2017/09/02 09:32:00 | 2017/09/04 10:12:00 | MODULE A | FIFTH ROLLER REPLACED | A15 |
| 10002033 | 2017/09/10 23:58:00 | 2017/09/11 09:30:00 | MODULE A | CLEANED | A00 |
| 10002001 | 2017/09/21 16:55:00 | 2017/09/24 11:02:00 | MODULE B | FIRST ROLLER REPLACED | B11 |
| 10001045 | 2017/09/22 12:11:00 | 2017/09/24 11:35:00 | MODULE C | MODULE REPLACED | C99 |
| ... | ... | ... | ... | ... | ... |

FIG. 10

EXPLANATORY VARIABLES USED FOR MACHINE LEARNING

| EQUIPMENT ID | PERIOD IDENTIFIER | EVENT-A OCCURRENCE RATE (EXPLANATORY VARIABLE 1) | ACTIVITY-B ACTIVATION COUNT (EXPLANATORY VARIABLE 2) | TEMPERATURE IN HOUSING (EXPLANATORY VARIABLE 3) | SENSOR-1 VALUE (EXPLANATORY VARIABLE 4) |
|---|---|---|---|---|---|
| 10001045 | PERIOD 1 | 0.33 | 124 | 23.4 | 44 |
| 10001045 | PERIOD 2 | 0.56 | 145 | 23.3 | 43 |
| 10001045 | PERIOD 3 | 0.12 | 135 | 25.3 | 51 |
| 10001045 | PERIOD 4 | 0.48 | 126 | 26.7 | 56 |
| 10001045 | PERIOD 5 | 0.25 | 127 | 23.4 | 57 |
| 10001045 | PERIOD 6 | 0.39 | 133 | 23.4 | 49 |
| 10001045 | PERIOD 7 | 0.11 | 141 | 23.3 | 51 |
| 10001045 | PERIOD 8 | 0.49 | 159 | 24.7 | 32 |

FIG. 11

RESPONSE VARIABLE USED FOR MACHINE LEARNING

| EQUIPMENT ID (1101) | PERIOD IDENTIFIER (1102) | EVENT OCCURRENCE RATE (LEARNING TARGET) (1103) | PERIOD UNTIL FAULT (1104) | RESPONSE VARIABLE COEFFICIENT (1105) | MALFUNCTION RISK (RESPONSE VARIABLE) (1106) |
|---|---|---|---|---|---|
| 10001045 | PERIOD 1 | 0.1 | 0 | 1 | 0.1 |
| 10001045 | PERIOD 2 | 0.2 | 60 | 1.2 | 0.24 |
| 10001045 | PERIOD 3 | 0.4 | 40 | 1.4 | 0.56 |
| 10001045 | PERIOD 4 | 0.4 | 20 | 1.8 | 0.72 |
| 10001045 | PERIOD 5 | 0.3 | 0 | 1 | 0.3 |
| 10001045 | PERIOD 6 | 0.2 | 0 | 1 | 0.2 |
| 10001045 | PERIOD 7 | 0.1 | 0 | 1 | 0.1 |
| 10001045 | PERIOD 8 | 0.4 | 0 | 1 | 0.4 |

NO DIVISION

DIVISION INTO TWO

DIVISION INTO THREE

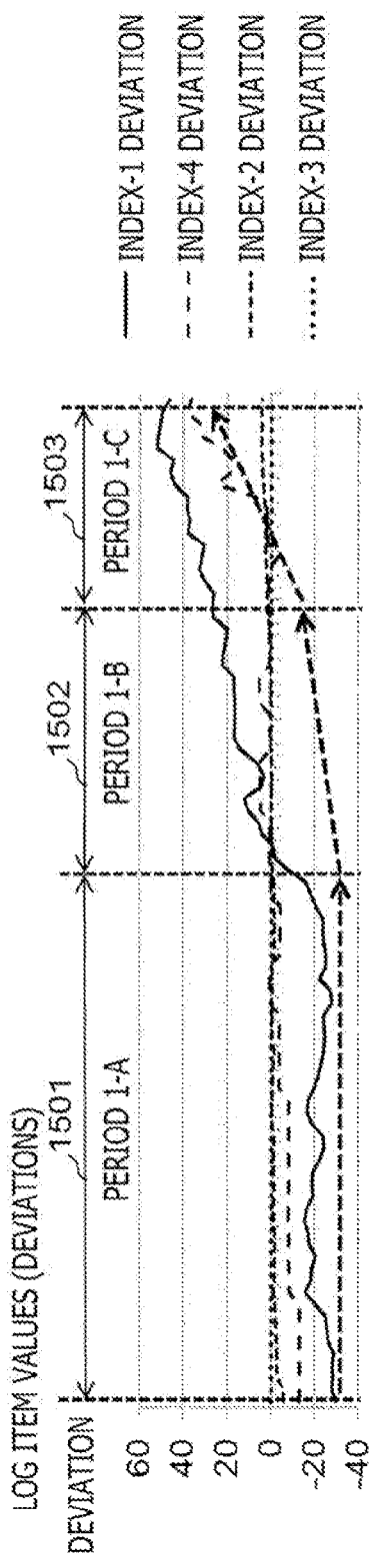
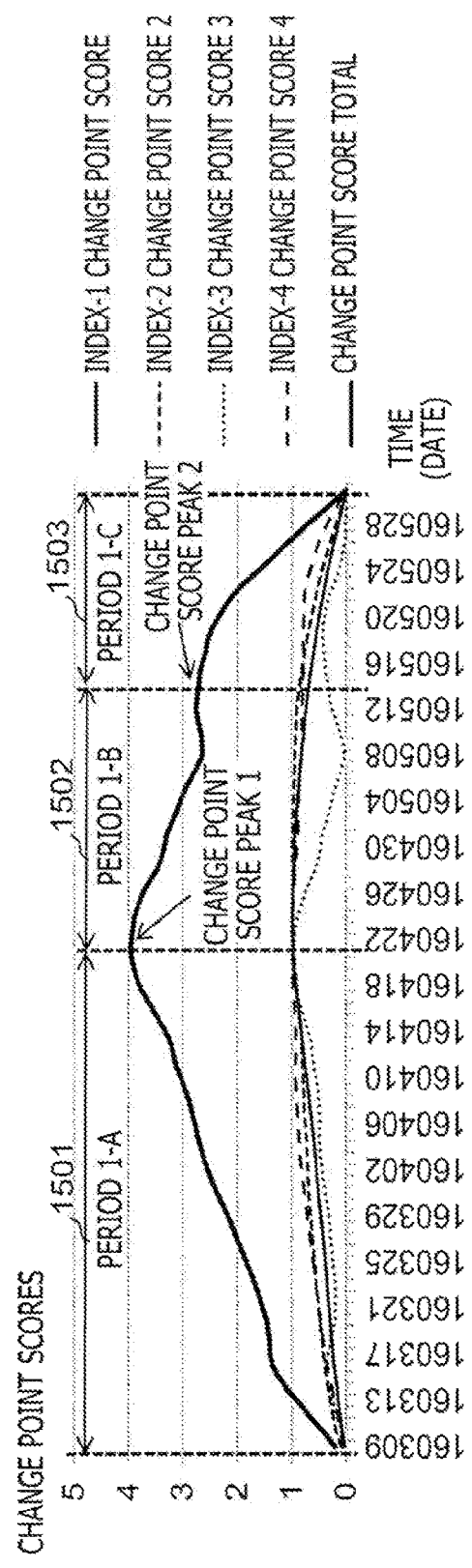
FIG. 16A
FIG. 16B

FIG.17

| EQUIPMENT ID | PERIOD IDENTIFIER | INDEX-1 DEVIATION AVERAGE VALUE | INDEX-2 DEVIATION AVERAGE VALUE | INDEX-3 DEVIATION AVERAGE VALUE | INDEX-4 DEVIATION AVERAGE VALUE |
|---|---|---|---|---|---|
| 10001045 | PERIOD 1-A | -22.39 | -1.47 | -0.01 | -6.89 |
| 10001045 | PERIOD 1-B | 9.61 | 0.09 | 0.04 | 2.47 |
| 10001045 | PERIOD 1-C | 38.06 | 3.07 | -0.01 | 12.21 |

FAULT PREDICTING SYSTEM AND FAULT PREDICTION METHOD

TECHNICAL FIELD

The present invention relates to a system that makes diagnoses about whether or not there are symptoms of faults in apparatuses, and predicts the faults of the apparatuses.

BACKGROUND ART

If apparatuses or facilities stop due to a fault, the maintenance cost increases, and additionally the customer satisfaction is damaged. Because of this, preventive maintenance of apparatuses and facilities is desired. In preventive maintenance, activity histories and/or operational states of apparatuses or facilities are recorded. On the basis of the information, maintenance such as component replacement is performed before a fault occurs, and the apparatuses or facilities are prevented in advance from being stopped entirely. As a system that predicts future faults on the basis of activity histories of apparatuses, there have been proposed a system that partially retrieves a portion in an operation log that corresponds to a certain length of time before a fault occurrence, associates the portion with the fault, performs machine learning by using information on the associated operation log and fault as an input to create a model, and uses the model to predict future faults.

Many apparatuses and facilities that are manufactured in recent years include machine mechanisms and electronic circuits, and have characteristics of both aspects of an information apparatus and a precision apparatus. Not only faults due to mechanical wear, but also faults of electronic circuits are anticipated, and there are diverse patterns (modes) of faults. In addition, typically, faults of apparatuses and facilities are roughly classified into faults due to wear of mechanism components and deterioration of electronic components and the like due to aging, and sudden faults due to external factors and the like. Here, the former is defined as deterioration faults, and the latter is defined as sudden faults.

In deterioration faults, changes occur in activities of apparatuses in some cases before fatal faults eventually occur, and those changes are observed as symptoms of the faults. For example, if a roller or a belt of a rotary portion degenerates due to wear caused by aging or the like, the rotary portion idles at the time when it is activated, the rotation speed becomes nonuniform, or other changes are observed. If these can be observed by sensors or the like, and phenomena can be captured in advance, it becomes possible to perform maintenance before a fatal fault occurs, and a fault that stops an apparatus or a facility can be prevented.

On the other hand, although sudden faults are difficult to predict in advance, phenomena such as increases in load that occur when wrong operation is performed on apparatuses can be captured as signs of faults. However, portions of apparatuses or facilities to be damaged as a result of the phenomena can vary variously, and periods from observation of indications of deterioration through the progression of the deterioration until eventual occurrences of fatal faults can vary variously depending on operational states after the phenomena are captured. Periods of operation logs to be partially retrieved and recorded for learning a pattern cannot be uniformly defined as certain periods before faults. If learning and fault prediction are performed by using operation logs partially retrieved with uniform temporal differences prior to fault occurrences, the operation logs do not necessarily include symptoms of faults, and this worsens the prediction precision.

Patent Document 1 discloses a technology of adjusting operation log periods (fault indication periods) used for learning in different manners for different instances of faults.

For example, Patent Document 1 discloses a technology for performing fault prediction by storing parameters used for activity control of an image forming apparatus (facsimile) as time series information, collating the parameters with fault patterns of periods predetermined for individual fault types, and classifying the parameters. On the basis of numerical data representing the tendency of the use situation of an apparatus based on operation logs of the apparatus, and fault types, the temporal differences and the period-lengths, based on the fault type, of operation logs (fault indications) to be partially retrieved for use in learning are decided.

PRIOR ART DOCUMENT

Patent Document
Patent Document 1: JP-2015-174256-A

SUMMARY OF THE INVENTION

Problem to be Solved by the Invention

According to the technology disclosed in Patent Document 1, it becomes possible to cope with temporal differences in timings when indications of different types of faults occur.

However, the technology of Patent Document 1 is based implicitly on a premise that apparatuses having similar operational states experience occurrences of faults a certain period after symptoms. Because of this, there is a limitation in terms of how the technology can cope with cases that there are variations in periods from indications of faults until actual occurrences of the faults.

An object of the present invention is to provide a technology that enhances the prediction precision of fault occurrences of apparatus or facilities.

Means for Solving the Problem

A fault predicting system according to one aspect of the present invention has: a storage apparatus that stores data in such a manner that the data can be overwritten and read out; and a processor that executes software program processing by using the data recorded in the storage apparatus. In the fault predicting system, the storage apparatus stores operation log information including a past operational state of a prediction target apparatus, and fault record information including a fault content and a fault-occurrence date/time related to a fault having occurred in the prediction target apparatus in a past, and the processor sequentially changes a reference time point which is equivalent to a fault-prediction-execution time point by setting, as a symptom sensing period, a period from a time point which is a predetermined first period-length before the reference time point until the reference time point, and by setting, as a prediction target period, a period from the reference time point until a time point which is a predetermined second period-length after the reference time point if a fault does not occur in the period from the reference time point until the time point which is the second period-length after the reference time point, and a period from the reference time point until a fault-occurrence time point if a fault occurs in the period from the reference time point until the time point which is the second period-length after the reference time point, and generates a fault prediction model for predicting a fault that occurs in the prediction target apparatus in a future by performing machine learning by using, as an explanatory variable, a feature quantity based on the operation log information of the symptom sensing period, and using, as a response variable, a fault index value based on whether or not there is a particular-event occurrence in the operation log information corresponding to a fault occurrence in the fault record information of the prediction target period, and a period-length from the reference time point until the fault-occurrence time point.

Advantages of the Invention

According to one aspect of the present invention, in a system that performs machine learning by using operation logs of apparatuses, and predicts faults of the apparatuses by using a model generated through the machine learning, it is made possible to learn variations in periods from symptoms until fault occurrences by performing learning taking into consideration periods until fault occurrences of the apparatuses, and it is possible to enhance the symptom sensing precision. In addition, simple and convenient means for dividing each of symptom sensing periods (explanatory variables) and prediction target periods (response variables) on the basis of apparatus state change points caused by maintenance or statistical change points of the variables, and converting time series changes of an operation log used for performing machine learning in each period into feature quantities can be provided to thereby enhance the symptom sensing precision.

BRIEF DESCRIPTION OF THE DRAWINGS

FIG. 3 is a figure illustrating one example of operation logs collected at apparatuses illustrated in FIG. 1.

FIG. 4 is a figure illustrating one example of a fault/maintenance record illustrated in FIG. 1.

FIG. 10 is a figure illustrating an example of explanatory variables used at the fault-model learning section illustrated in FIG. 1.

FIG. 11 is a figure illustrating an example of a response variable used at the fault-model learning section illustrated in FIG. 1.

FIGS. 16A and 16B are figures illustrating an example in which period division is implemented by using indexes obtained from an operation log, in which FIG. 16A is a figure illustrating the transition of log item values (deviations), and FIG. 16B is a figure illustrating the transition of change point scores.

FIG. 17 is a figure illustrating the average values of deviations in individual sections of each log item as an index illustrated in FIGS. 16A and 16B.

MODES FOR CARRYING OUT THE INVENTION

Figure 1:
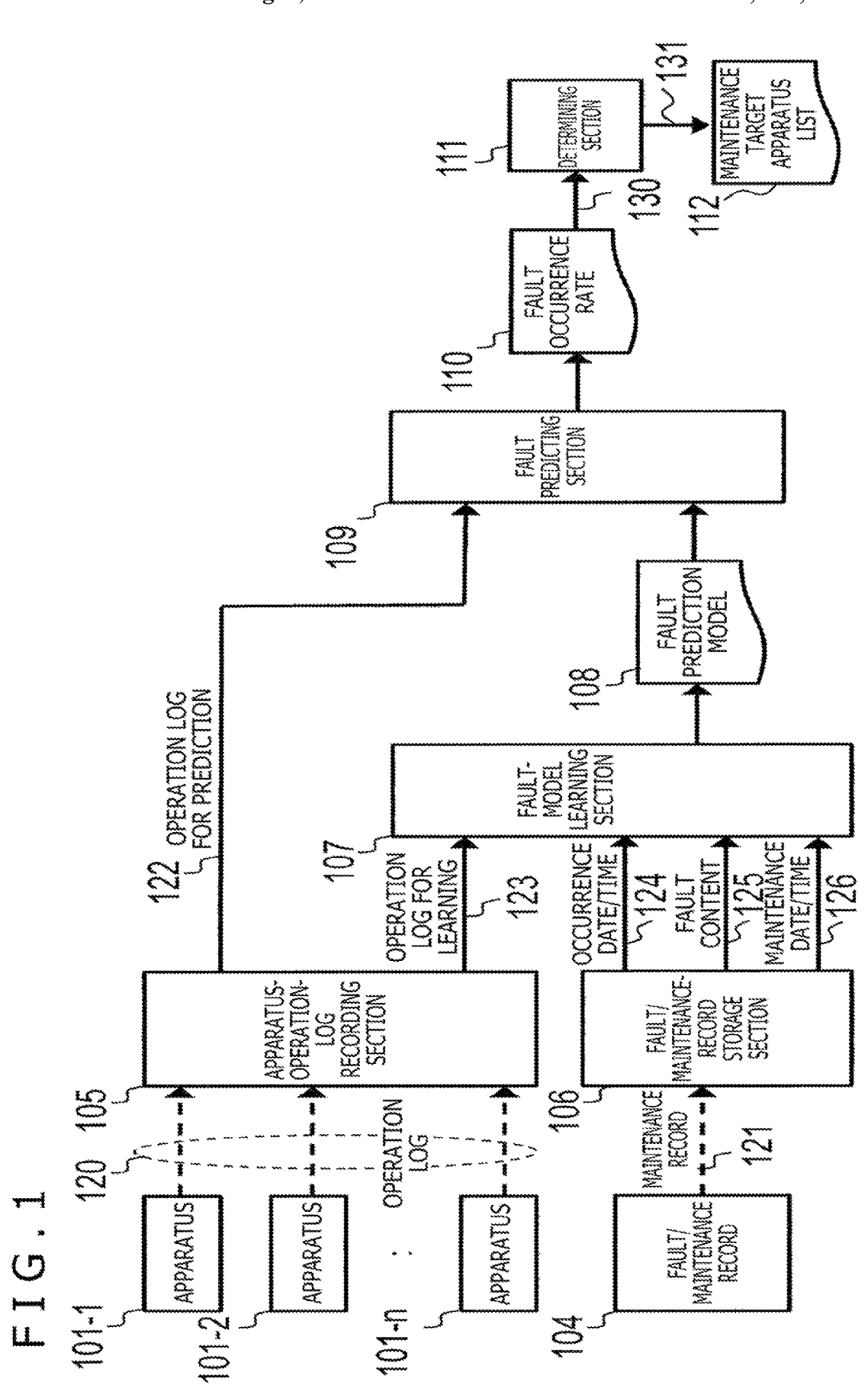
FIG. 1 is a block diagram of a fault predicting system according to the present embodiment.
Figure 2:
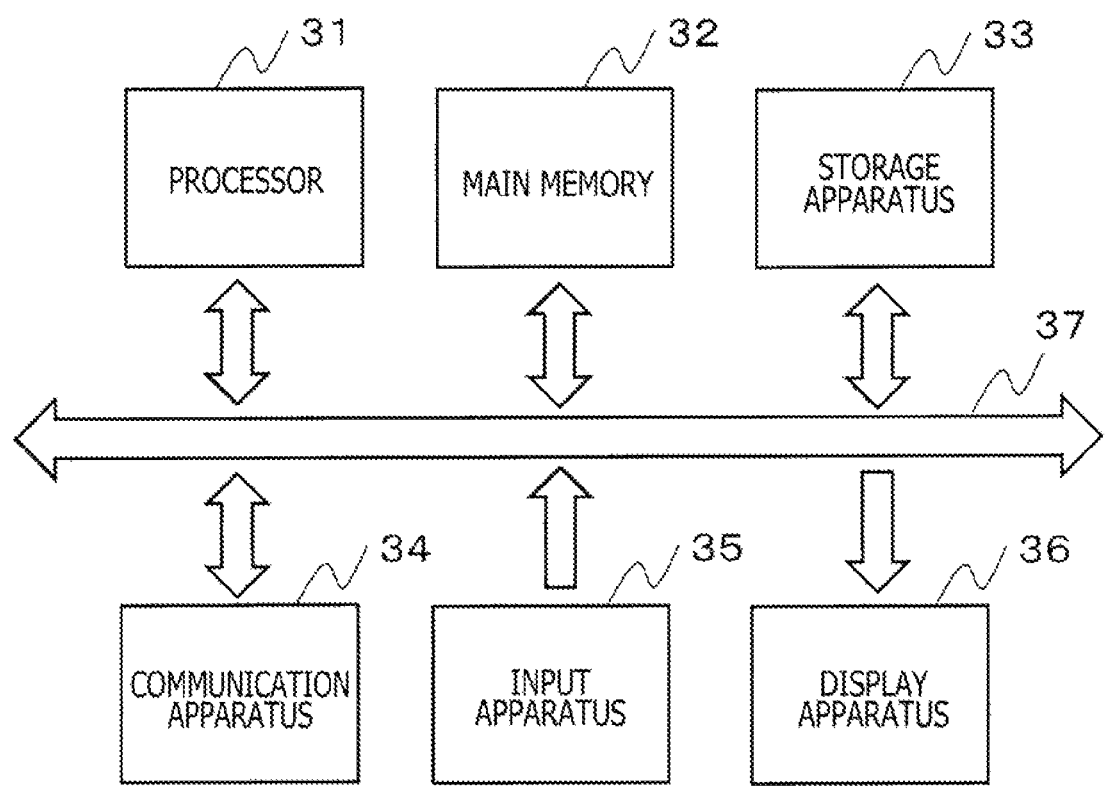
FIG. 2 is a figure illustrating the hardware configuration for realizing the fault predicting system illustrated in FIG. 1.

FIG. 1 is a block diagram of a fault predicting system according to the present embodiment. FIG. 2 is a figure illustrating the hardware configuration for realizing the fault predicting system illustrated in FIG. 1.

As illustrated in FIG. 1, in the present embodiment, machine learning of an operation log 120 collected from a plurality of apparatuses 101-1 to 101-n as prediction target apparatuses and a fault/maintenance record 104 about the plurality of apparatuses 101-1 to 101-n is performed, and a fault prediction model is generated. The fault predicting system according to the present embodiment has an apparatus-log recording section 105, a fault/maintenance-record storage section 106, a fault-model learning section 107, a fault predicting section 109 and a determining section 111. Then, by inputting an apparatus operation log to the generated fault prediction model, fault-occurrence rates are predicted, and threshold determinations of the fault-occurrence rates are made, and thereby the fault risks of the apparatuses 101-1 to 101-n are determined.

In one possible manner, as illustrated in FIG. 2, the thus-configured fault predicting system is realized by hardware in which a processor 31, a main memory 32, a storage apparatus 33, a communication apparatus 34, an input apparatus 35 and a display apparatus 36 are connected to each other by a bus 37. The storage apparatus 33 stores data in such a manner that the data can be overwritten and read out, and this storage apparatus 33 realizes the apparatus-operation-log recording section 105 and the fault/maintenance-record storage section 106 illustrated in FIG. 1. The processor 31 reads out the data stored in the storage apparatus 33, supplies the data to the main memory 32, and executes software program processing, and this processor 31 realizes the fault-model learning section 107, the fault predicting section 109 and the determining section 111 illustrated in FIG. 1. The communication apparatus 34 can transmit information obtained through processing at the processor 31 via wired or wireless connection. The input apparatus 35 includes a keyboard, a mouse and the like, and is for receiving inputs of information. The operation log 120 of the apparatuses 101-1 to 101-n, and/or a maintenance record 121 are input via the communication apparatus 34 and/or the input apparatus 35. The display apparatus 36 includes output means such as a display, and can display-output a prediction model, a maintenance list and the like.

The apparatuses 101-1 to 101-n have functions of collecting operation logs, accumulating the operation logs therein, and transmitting the operation logs (not illustrated).

FIG. 3 is a figure illustrating one example of the operation logs collected at the apparatuses 101-1 to 101-n illustrated in FIG. 1.

The operation logs collected at the apparatuses 101-1 to 101-n illustrated in FIG. 1 include past operational states of the apparatuses 101-1 to 101-n. For example, as illustrated in FIG. 3, an operation log includes an equipment ID 401 that can uniquely identify each of the apparatuses, and various types of record information concerning operation that are recorded corresponding to respective of dates/times 402 when a record is added to the operation logs. The various types of record information concerning operation include: particular-event occurrence counts 403 which are detection records such as failures of the apparatus; values 404 of sensors monitoring activities of the apparatus; histories 405 of operation of the apparatus by an operator or a user; setting parameters 406 of the apparatus at those time points; and the like.

FIG. 4 is a figure illustrating one example of the fault/maintenance record 104 illustrated in FIG. 1.

In the fault/maintenance record 104 illustrated in FIG. 1, fault record information including dates/times of occurrence of faults having occurred in the apparatuses 101-1 to 101-n, and fault contents and fault-occurrence dates/times related to the faults such as maintenance and repair is recorded. It is anticipated that the information includes, in addition to information recorded automatically by the apparatuses themselves, information recorded as work records by maintenance workers, and, as illustrated in FIG. 4, includes: equipment IDs 501 that can uniquely identify the apparatuses; fault-occurrence dates/times 502; maintenance-implementation dates/times 503; targets 504 to which faults have occurred and on which maintenance has been performed; maintenance contents 505; and the like. Since the maintenance contents are recorded manually by workers at maintenance sites in some cases, there can be inconsistencies in how they are written, or they are not written at all in some cases. In addition, symbols 506 according to the maintenance targets 504 and the maintenance contents 505 are entered in some cases to thereby facilitate classification and tabulation of the contents of faults and maintenance in data processing.

Typically, there are temporal differences from occurrences of faults in apparatuses until implementation of maintenance. Activities of the apparatuses experience at least two large state changes at the time when a fault occurs, and at the time when maintenance is implemented.

The operation log 120 collected from the apparatuses 101-1 to 101-n is recorded and accumulated in the apparatus-operation-log recording section 105. The operation log recorded and accumulated in the apparatus-operation-log recording section 105 is used for two purposes, that is, for machine learning for predicting faults and extracting features of symptoms of the faults, and for prediction of fault-occurrence probabilities by using a model of faults generated by the machine learning. An operation log for machine learning 123 is input to the fault-model learning section 107, and used for performing learning to generate a fault prediction model. An operation log for prediction 122 of fault-occurrence probabilities is input to the fault predicting section 109.

The maintenance record 121 collected from the apparatuses 101-1 to 101-n or the maintenance workers are recorded and accumulated in the fault/maintenance-record storage section 106. The maintenance record 121 recorded and accumulated in the fault/maintenance-record storage section 106 is classified into fault-occurrence dates/times 124, fault contents 125 and maintenance dates/times 126, and input to the fault-model learning section 107. At the fault-model learning section 107, machine learning is performed for analyzing correlations whether or not there are indications associated with faults occurring in the apparatuses 101-1 to 101-n in the operation log collected from the apparatuses 101-1 to 101-n prior to the faults.

Machine learning uses occurrences of faults and particular events as teaching signals (response variables) to generate a model that classifies states by using an operation log input as explanatory variables. There are various techniques such as discriminant analysis, logistic regression or decision tree, and those techniques are not mentioned in detail here. Typically, a model is expressed by a polynomial called a regression formula, and data equivalent to explanatory variables is input to the polynomial to thereby predict response variables. In addition to supervised learning in which learning is performed by using occurrences of faults and particular events as teaching signals, there is also a technique in which learning is performed by using an operation log of an apparatus implicitly as a normal case, and a determination about an abnormality is made on the basis of the statistical distance of a state space at the time when abnormal data is input.

As mentioned below, the fault-model learning section 107 sequentially changes a reference time point which is equivalent to a prediction-execution time point at which maintenance is executed by setting, as a symptom sensing period, a period from a time point which is a predetermined first period-length before the reference time point until the reference time point, and by setting, as a prediction target period, a period from the reference time point until a time point which is a predetermined second period-length after the reference time point if a fault does not occur in the period from the reference time point until the time point which is the second period-length after the reference time point, and a period from the reference time point until a fault-occurrence time point if a fault occurs in the period from the reference time point until the time point which is the second period-length after the reference time point, and generates a fault prediction model for predicting a fault that occurs in the apparatuses 101-1 to 101-n in the future by performing machine learning by using, as an explanatory variable, a feature quantity based on operation log information of the symptom sensing period, and using, as a response variable, a fault index value based on whether or not there is a particular-event occurrence in the operation log information corresponding to a fault occurrence in the fault record information of the prediction target period, and a period-length from the reference time point until the fault-occurrence time point.

A fault prediction model 108 generated by the machine learning at the fault-model learning section 107 is input to the fault predicting section 109. The fault predicting section 109 also receives an input of the operation log for prediction 122 output from the apparatus-operation-log recording section 105, and predicts the rates of fault occurrence at the apparatuses 101-1 to 101-$n$ on the basis of the fault prediction model 108 and the operation log for prediction 122. At this time, as a response variable, the model may predict whether or not faults will occur or may predict the particular-event occurrence rates associated with faults, or the like.

A fault occurrence rate 110 predicted at the fault predicting section 109 is input to the determining section 111. At a determination 111, a threshold determination of the fault occurrence rate 110 is made, and a maintenance target apparatus list 112 is output as a list of apparatuses which are likely to experience faults.

In the following, the apparatus-operation-log recording section 105, the fault/maintenance-record storage section 106 and the fault-model learning section 107 mentioned above are explained in detail.

Figure 5:
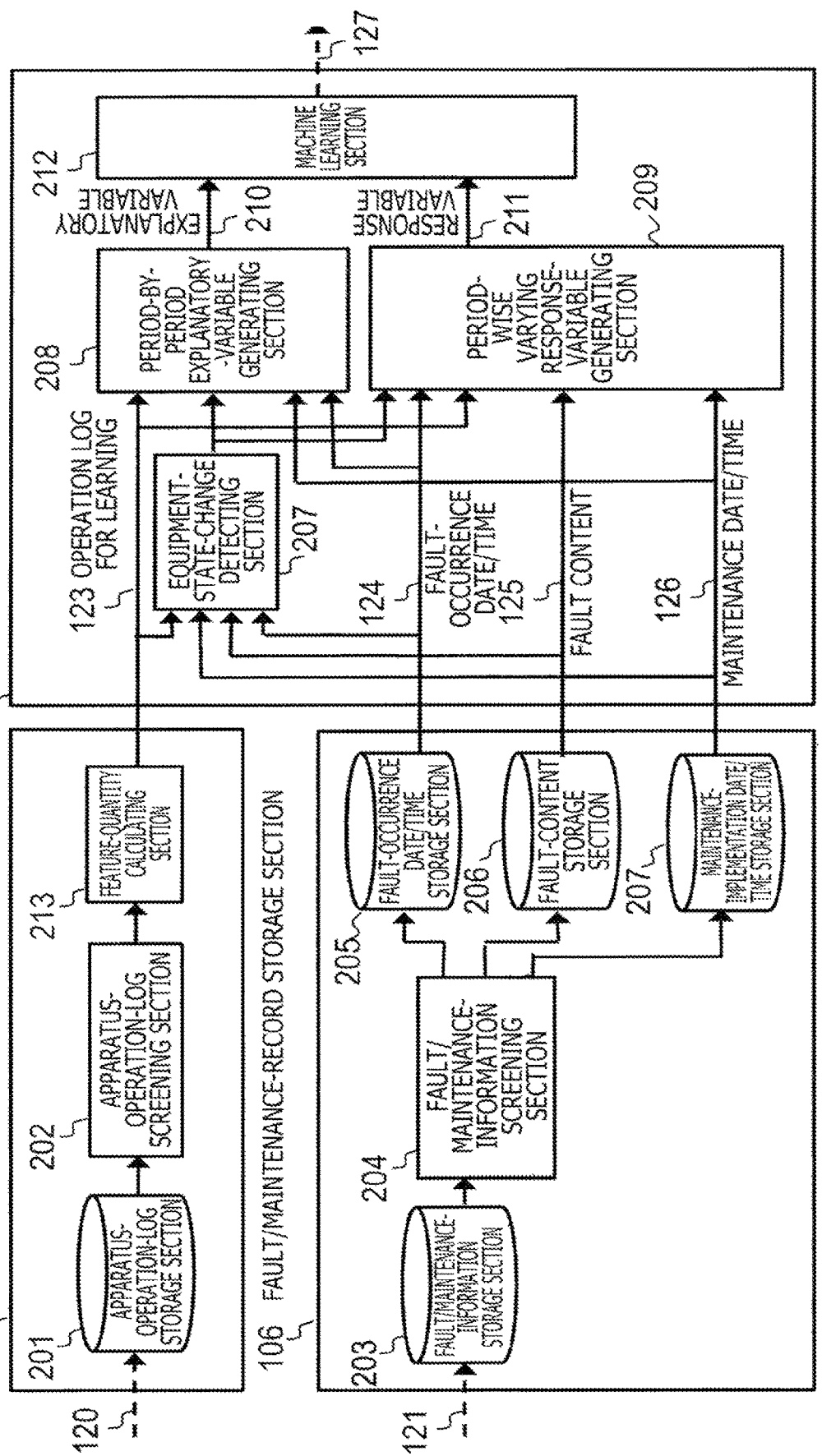
FIG. 5 is a figure illustrating the configurations of an apparatus-operation-log recording section, a fault/maintenance-record storage section and a fault-model learning section illustrated in FIG. 1.

FIG. 5 is a figure illustrating the configurations of the apparatus-operation-log recording section 105, the fault/maintenance-record storage section 106 and the fault-model learning section 107 illustrated in FIG. 1.

As illustrated in FIG. 5, the apparatus-operation-log recording section 105 illustrated in FIG. 1 has an apparatus-operation-log storage section 201, an apparatus-operation-log screening section 202 and a feature-quantity calculating section 213.

The operation log 120 collected from the apparatuses 101-1 to 101-$n$ is recorded in the apparatus-operation-log storage section 201 of the apparatus-operation-log recording section 105. Typically, in some cases, apparatus operation logs that are collected mechanically include overlaps or defects depending on operational situations of the apparatuses or collection routes, and additionally include items which are not recorded almost at all and data which is inappropriate for analysis.

Because of this, at the apparatus-operation-log screening section 202, these inappropriate pieces of data are subjected to cleansing (elimination, correction and complementation). In addition, depending on the types of operation logs, it is also necessary in some cases to perform an appropriate tabulation process. Examples of the tabulation process include an averaging process over a certain period, and reference not to absolute values but to rates and/or distributions. Because of this, such a tabulation process is performed at the feature-quantity calculating section 213, and a result thereof is output as an operation log for learning 123.

In addition, as illustrated in FIG. 5, the fault/maintenance-record storage section 106 illustrated in FIG. 1 has a fault/maintenance-information storage section 203, a fault/maintenance-information-log screening section 204, a fault-occurrence date/time storage section 205, a fault-content storage section 206 and a maintenance-implementation date/time storage section 207.

The maintenance record 121 collected from the apparatuses 101-1 to 101-$n$ or the maintenance workers are stored in the fault/maintenance-information storage section 203 of the fault/maintenance-record storage section 106. Then, similar to the apparatus-log-operation recording section 105, the fault/maintenance-information screening section 204 performs cleansing (elimination, correction and complementation) of fault/maintenance data.

Then, since the fault/maintenance information includes not consecutive pieces of data but events, the fault/maintenance information is classified into records of fault-occurrence dates/times, fault contents, and maintenance-implementation dates, which are then stored in the fault-occurrence date/time storage section 205, the fault-content storage section 206 and the maintenance-implementation date/time storage section 207, respectively.

The operation log for learning 123 output from the feature-quantity calculating section 213, and the fault-occurrence date/time 124, the fault content 125 and the maintenance date/time 126 stored in the fault-occurrence date/time storage section 205, the fault-content storage section 206 and the maintenance-implementation date/time storage section 207, respectively, are input to the fault-model learning section 107.

As illustrated in FIG. 5, the fault-model learning section 107 illustrated in FIG. 1 has an equipment-state-change detecting section 207, a period-by-period explanatory-variable generating section 208, a period-wise varying response-variable generating section 209 and a machine learning section 212.

At the thus-configured fault-model learning section 107, a response variable 211 is generated on the basis of an operation log associated with a fault or fault/maintenance information at the period-wise varying response-variable generating section 209, and also an explanatory variable 210 of a symptom of a fault is generated on the basis of the operation log for learning prior to the fault at the period-by-period explanatory-variable generating section 208.

A characteristic is that, at this time, data periods of the operation log for learning 123, the fault-occurrence date/time information 124, the fault content information 125 and the maintenance date/time information 126 for generation of the explanatory variable 210 and the response variable 211 are decided on the basis of equipment state changes.

Equipment state changes occur: when activities of an apparatus change due to wear or damages of mechanism components or electronic components constituting at least part of the apparatus before a fault occurs in the apparatus, and a change occurs in the statistical nature of an operation log (symptom); when a fault actually occurred in the apparatus; or when maintenance is performed and component replacement or the like is performed.

Equipment state changes are detected by the equipment-state-change detecting section 207. At the equipment-state-change detecting section 207, the operation log for learning 123 is referred to, and when a change occurs in the statistical nature, periods for the explanatory variable and the response variable are set by using the fault-occurrence date/time information 124 and the maintenance-implementation date/time information 126. The period-by-period explanatory-variable generating section 208 and the period-wise varying response-variable generating section 209 generate the explanatory variable 210 and the response variable 211, respectively, on the basis of information of the equipment state change detected by the equipment-state-change detecting section 207, and input the explanatory variable 210 and the response variable 211 to the machine learning section 212.

By using the input explanatory variable 210 and the response variable 211, the machine learning section 212 generates and outputs the fault prediction model 108.

In the following, the fault predicting section 109 and the determining section 111 illustrated in FIG. 1 are explained in detail.

Figure 6:
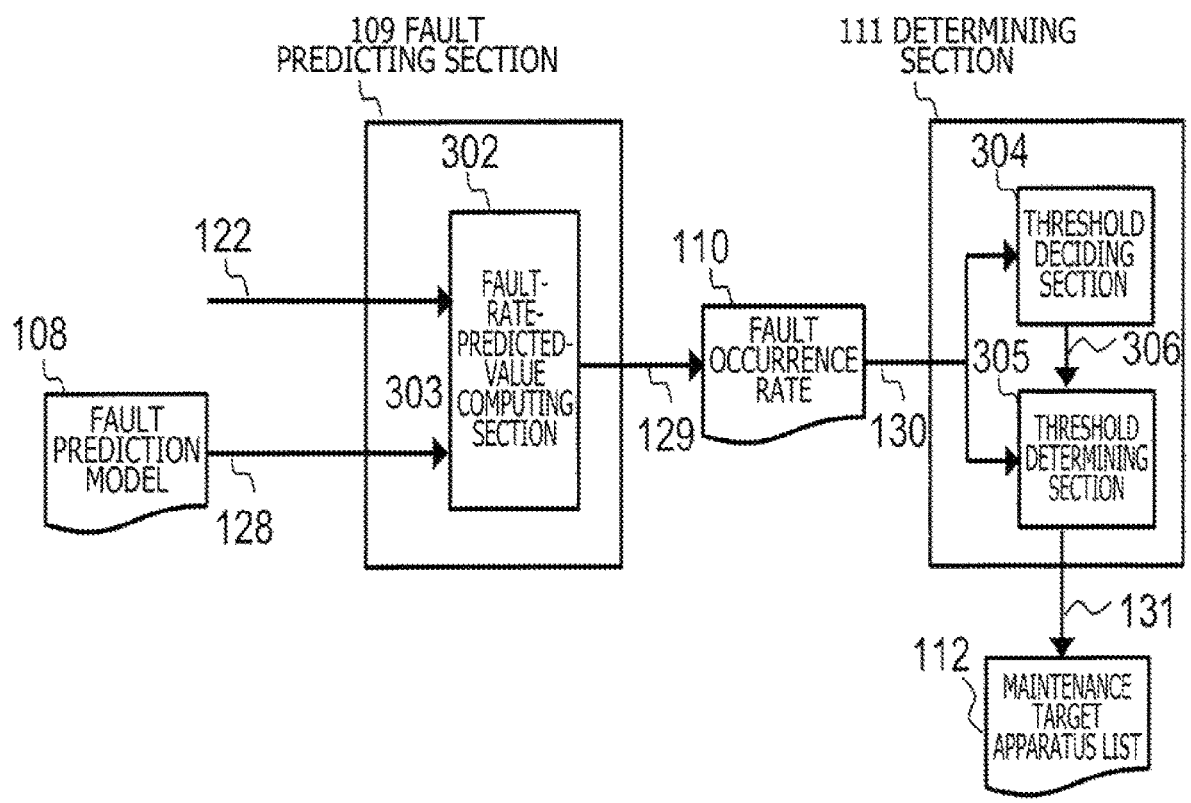
FIG. 6 is a figure illustrating the configurations of a fault predicting section and a determining section illustrated in FIG. 1.

FIG. 6 is a figure illustrating the configuration of the fault predicting section 109 and the determining section 111 illustrated in FIG. 1.

As illustrated in FIG. 6, the fault predicting section 109 illustrated in FIG. 1 has a fault-rate-predicted-value computing section 302. At the fault predicting section 109, the fault-rate-predicted-value computing section 302 inputs the operation log for prediction 122 output from the apparatus-operation-log recording section 105 to the fault prediction model 108 obtained through the machine learning at the fault-model learning section 107. Thereby, the fault predicting section 109 predicts the fault-occurrence rate for each of the apparatuses 110-1 to 110-$n$. Typically, the fault prediction model 108 includes a polynomial, and by inputting, to this polynomial, the operation log for prediction 122 which has been converted into a feature quantity by the feature-quantity calculating section 213, the fault occurrence rates 110 are computed.

As illustrated in FIG. 6, the determining section 111 illustrated in FIG. 1 has a threshold determining section 305 and a threshold deciding section 304. At the determining section 111, the threshold determining section 305 compares the fault occurrence rates 110 computed at the fault predicting section 109 with a threshold, and extracts apparatuses whose fault occurrence rates 110 are higher than the threshold, and outputs a list of the apparatuses as the maintenance target equipment list 112 for performing preventive maintenance. At this time, the threshold may be input to the system in advance, or may be decided at the threshold deciding section 304 on the basis of the number of extraction target apparatuses or the like.

In the following, a method of deciding data sections during which an explanatory variable and a response variable are generated in accordance with an apparatus state change is explained.

Figure 7:
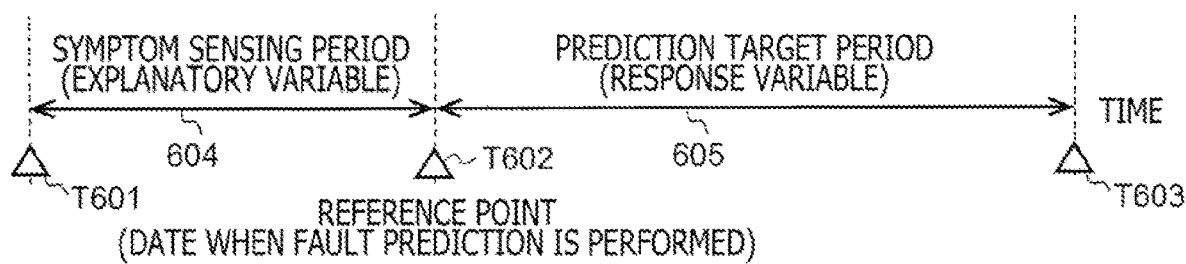
FIG. 7 is a figure illustrating a way of thinking about a period for learning a symptom of a fault in the fault predicting system illustrated in FIG. 1.
Figure 8:
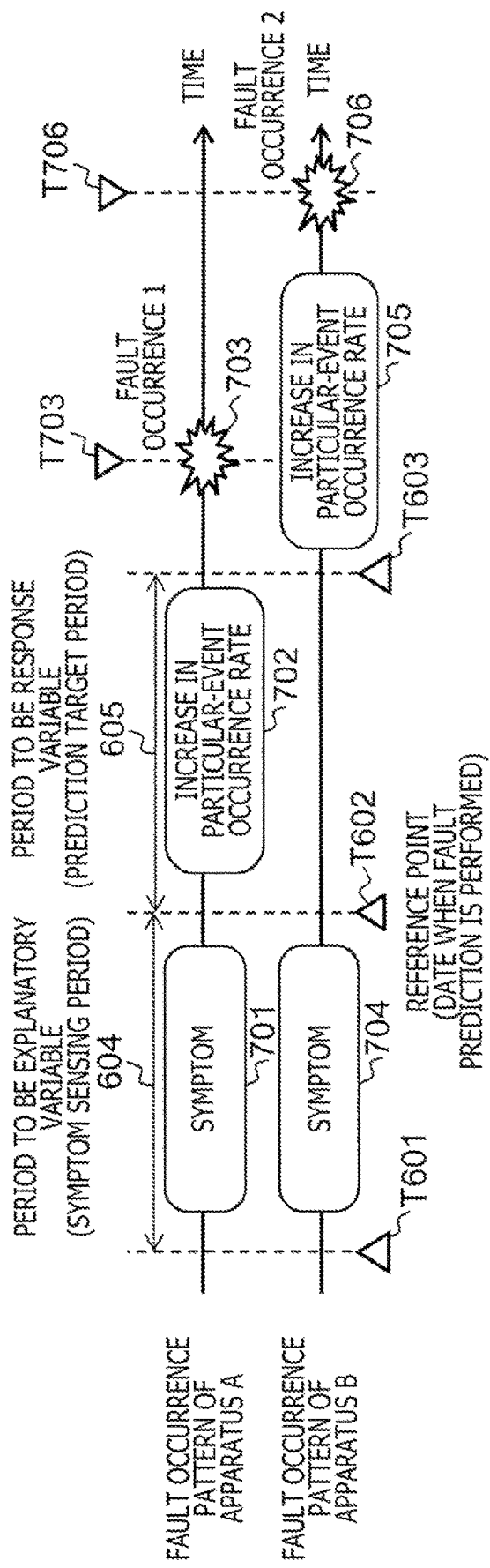
FIG. 8 is a figure illustrating relationships between fault occurrences in apparatuses and particular-event occurrence rates associated with the faults.

FIG. 7 is a figure illustrating a way of thinking about a period for learning a symptom of a fault in the fault predicting system illustrated in FIG. 1. FIG. 8 is a figure illustrating relationships between fault occurrences in apparatuses and particular-event occurrence rates associated with faults.

As illustrated in FIG. 7, in an example considered here, a symptom of a fault of an apparatus is detected at a certain reference point T602. The purpose is to predict whether or not a fault will occur in the period from the reference point T602 until T603 by using an apparatus operation log in the period from the reference point T602 back to T601. Here, the past period 604 before the reference point, the period being from the T601 to T602, may also be called a symptom sensing period. In addition, the future period 605 ahead of the reference point, the period being from T602 until T603, may also be called a prediction target period.

In the machine learning, learning is performed repetitively by using operation logs of symptom sensing periods 604 as explanatory variables, and fault occurrences and event occurrence rates associated with the faults of prediction target periods 605 as response variables. Thereby, a model of features of the operation logs associated with the faults is generated.

That is, as illustrated in FIG. 8, it is hypothesized that a solid that is to eventually experience a fault exhibits an increase in the particular-event occurrence rate associated with the fault before the occurrence of the fault, and furthermore a symptom of the fault appears in an operation log before the increase. However, typically, periods from occurrences of wear of mechanism components or electronic components constituting at least part of an apparatus to trigger some state change through occurrences of increases in the particular-event occurrence rates of associated with fault occurrences until actual fault occurrences are not uniform, but vary largely depending on the environments in which the apparatuses are placed, on how much the apparatuses are operated or on other factors.

In the case illustrated in FIG. 8, regarding an apparatus A, with the reference point T602 at which a fault prediction is performed being set as a reference, after a symptom 701 appears in an operation log, an increase 702 in the particular-event occurrence rate associated with a fault occurrence, and a fault occurrence 703 occur consecutively. On the other hand, in the example illustrated regarding an apparatus B, with the reference point T602 at which a fault prediction is performed being set as a reference, after a symptom 704 appears in an operation log, an increase in the particular-event occurrence rate associated with a fault occurrence does not occur for a while, and after a lapse of time until T603, an increase 705 in the particular-event occurrence rate and a fault occurrence 706 occur.

If machine learning is performed by setting, as a symptom sensing period, the fixed period 604 from T601 which is a certain period before the reference point until the reference point T602, and setting, as a prediction target period, the fixed period 605 from the reference point T602 until T603 which is a certain period after the reference point in this manner, these periods give learning data regarding the apparatus B which includes a symptom, but nonetheless does not include the occurrence of an increase in the particular-event occurrence rate in the prediction period, thereby inevitably worsening the learning precision.

In view of this, in the present embodiment, generation of response variables is performed by taking into consideration the length of time that elapses from a reference point until a fault occurrence in a prediction target period.

Figure 9:
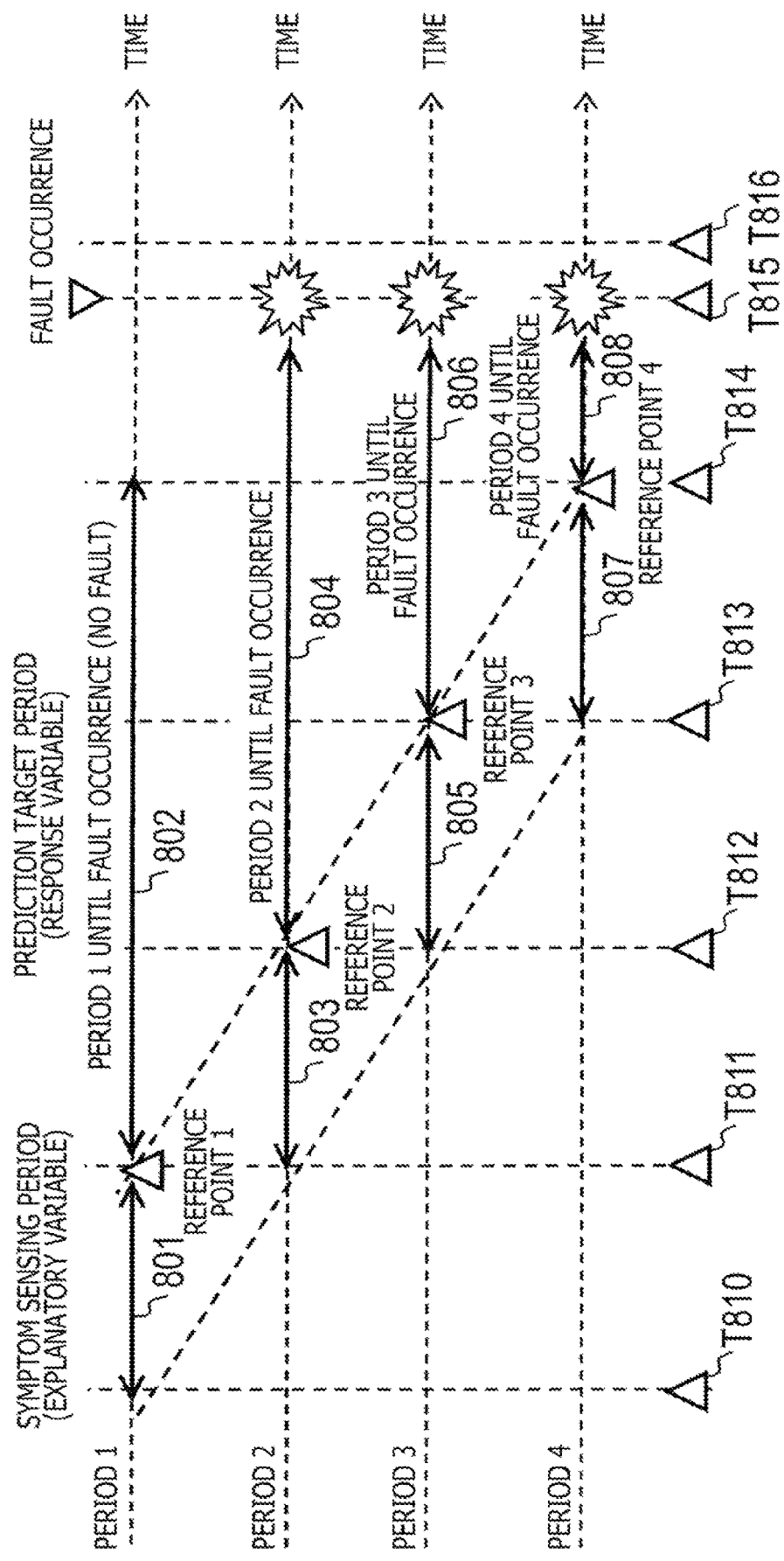
FIG. 9 is a figure for explaining a method of performing generation of a response variable taking into consideration the length of time that elapses from a reference point until a fault occurrence in a prediction target period illustrated in FIG. 7.

FIG. 9 is a figure for explaining a method of performing generation of a response variable taking into consideration the length of time that elapses from a reference point until a fault occurrence in a prediction target period illustrated in FIG. 7.

At the fault-model learning section 107 in the present embodiment, for example in one possible manner as illustrated in FIG. 9, for one apparatus, the reference point is sequentially changed so as to set the symptom sensing period and the prediction target period while staggering periods, and machine learning is performed repetitively.

In the example illustrated as Period 1, a period 801 from T810 until T811 is set as the symptom sensing period, a period 802 from T811 until T814 is set as the prediction target period, and learning is performed. In the present example, the length of the period 801 may be called the first period-length, and the length of the period 802 may be called the second period-length. At this time, since in the prediction period 802, a fault does not occur, learning is performed by using the particular-event occurrence rate of the actual prediction target period as a response variable. Since if equipment is normal, it is anticipated that the particular-event occurrence rate is low, learning data for normal cases is generated in Period 1.

In the example illustrated as Period 2, a period 803 from T811 until T812 is set as the symptom sensing period, a period from T811 until T816 is set as the prediction target period, and learning is performed. That is, in the present example, the length of the period 803 may be called the first period-length. At this time, a fault occurs at the timing of T815 in the prediction target period. Since the apparatus state changes largely between before and after a fault, it is not appropriate to perform learning by using data of a period including an apparatus fault. In view of this, in the present embodiment, learning is performed by setting a period until before the fault occurrence, the period being from T812 until T815, as the prediction target period. That is, in the present example, the length of the period 804 from T811 until T815 may be called the second period-length.

Regarding Period 3 and Period 4 also, since the fault occurs in the periods equivalent to the prediction target period, learning is performed by setting the prediction target period to a period 806 from T813 to T815 and a period 808 from T814 to T815.

In Period 2, Period 3 and Period 4, the lengths of the periods 804, 806 and 808 from their reference points T812, T813 and T814 until the fault occurrence are different. In the present embodiment, a coefficient is set for the particular-event occurrence rate, which is a response variable, in accordance with the length of a period from the reference point until a fault occurrence, and learning is performed such that as the length of a period from the reference point until a fault occurrence decreases, the fault risk calculated through evaluation increases.

In this manner, by using a response variable reflecting the coefficient having a value according to the period-length from a time point at which prediction is executed until a time point of a fault occurrence, it becomes possible to compute a fault risk as a large value if the period until the fault occurrence is short.

FIG. 10 is a figure illustrating an example of explanatory variables used at the fault-model learning section 107 illustrated in FIG. 1.

As illustrated in FIG. 10, the explanatory variables used at the fault-model learning section 107 illustrated in FIG. 1 use, as keys, an equipment ID 1001 that can uniquely specify an apparatus, and period identifiers 1002 that can uniquely identify periods, and operation log items which are related to those keys are expressed as feature quantities. As operation log items expressed as feature quantities, there are a particular-event occurrence rate (event-A occurrence rate 1003), a record of a particular activity (activity-B activation count 1004), environment information (temperature in a housing 1005), a value of a sensor monitoring an apparatus (sensor-1 values 1006), and the like.

FIG. 11 is a figure illustrating an example of a response variable used at the fault-model learning section 107 illustrated in FIG. 1.

As illustrated in FIG. 11, the response variables used at the fault-model learning section 107 illustrated in FIG. 1 uses, as keys, an equipment ID 1101 that can uniquely specify an apparatus, and period identifiers 1102 that can uniquely identify periods, and items 1103 to 1106 which are associated with faults related to those keys are expressed. Here, the prediction target is the particular-event occurrence rate 1103 associated with a fault indicative of a particular-event occurrence probability, but the response variable coefficient 1105 is changed in accordance with the period 1104 until a fault in the prediction target period, and the event occurrence rate 1103 is multiplied by the coefficient 1105 to thereby compute, as a malfunction risk, the response variable 1106 to be a fault index value. Cases in which periods until fault occurrences are zero are cases in which faults do not occur in the prediction target period of the periods.

In this manner, it becomes possible to perform learning according to situations until faults occur by changing the response variable coefficient in accordance with periods until faults in the prediction target period, and multiplying an event occurrence rate by the coefficient to compute a fault index value.

Period 1 to Period 4 of period identifiers 1101 in FIG. 11 correspond to Period 1 to Period 4 in FIG. 9. Since a fault does not occur in the prediction target period in Period 1, the event occurrence rate 1103 to be a learning target, which is "0.1," is used as the response variable 1106 with no changes being made thereto.

Since the fault occurs in the prediction target period in Period 2 to Period 4, the response variable coefficient 1105 decided in accordance with the period 1104 until the fault is set to "1.2." Then, "0.24" which is obtained by multiplying the event occurrence rate 1103 associated with a prediction target fault, which is "0.2," by the response variable coefficient 1105 is used as the response variable indicative of a malfunction risk.

The response variable coefficient 1105 decided in accordance with the period 1104 until a fault occurrence is set such that the response variable coefficient 1105 increases as the length of the period until a fault occurrence decreases. Thereby, the malfunction risk is evaluated more correctly even if there are variations in the period from symptoms until fault occurrences.

Figure 12:
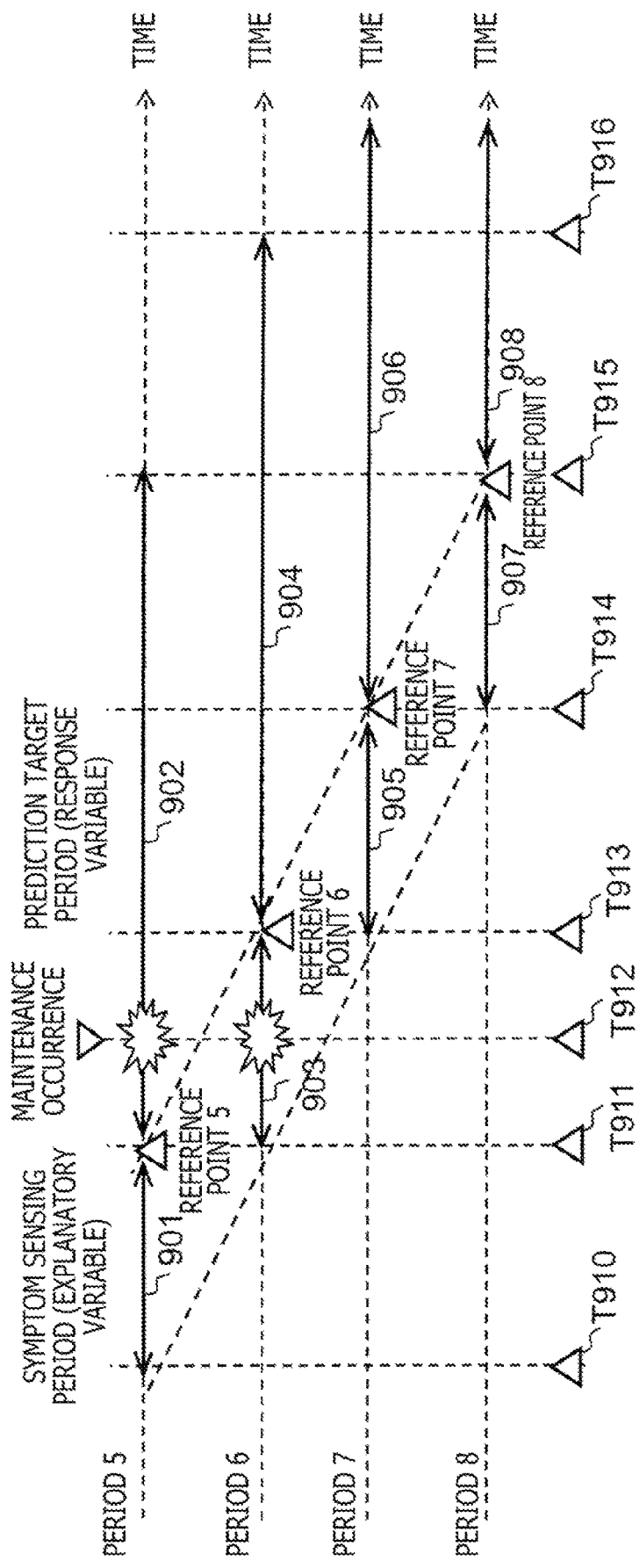
FIG. 12 is a figure for explaining a method of performing generation of an explanatory variable and a response variable in a case where maintenance is implemented in a symptom sensing period or a prediction target period illustrated in FIG. 7.

FIG. 12 is a figure for explaining a method of performing generation of an explanatory variable and a response variable in a case where maintenance is implemented in the symptom sensing period or the prediction target period illustrated in FIG. 7.

In the example illustrated in FIG. 12, maintenance is implemented at the timing of T912. In Period 5, the period from T910 to T911 is a symptom sensing period 901, and the period from T911 to T915 is a prediction target period 902, but maintenance is implemented at T912 which is in the prediction target period. In addition, in Period 6, the period from T911 to T913 is the symptom sensing period, but maintenance is implemented at T912 which is in the symptom sensing period.

If cleaning, component replacement or adjustment is performed in the maintenance, the state of the apparatus changes largely between before and after the maintenance. Accordingly, for both the symptom sensing period and the prediction target period, learning data including maintenance becomes a cause of worsening the learning precision. In view of this, in the present embodiment, a maintenance-implementation time point at which maintenance has been implemented in response to a fault is recorded in fault record information, this information of the maintenance-implementation time point is made use for generation of a response variable and an explanatory variable, and operation log information of the symptom sensing period or the prediction target period including the maintenance-implementation time point in the fault record information is excluded from the machine learning. In this manner, by excluding, in the machine learning, information of a period in which the state of an apparatus changes due to maintenance implementation, noises can be reduced to enhance the precision of the machine learning.

In the example of the explanatory variables illustrated in FIG. 10, the explanatory variables indicated for period identifiers 1002 in Period 5 to Period 8, correspond to Period 5 to Period 8 in FIG. 12. Since the maintenance is implemented in the symptom sensing period in Period 6, information of Period 6 is excluded from learning data.

In the example of the response variable illustrated in FIG. 11, the explanatory variables indicated for period identifiers 1102 in Period 5 to Period 8, correspond to Period 5 to Period 8 in FIG. 12. Since the maintenance is implemented in the prediction target period in Period 5, information of Period 5 is excluded from learning data.

Since maintenance does not occur in the symptom sensing period and the prediction target period in Period 7 and Period 8 in FIG. 12, exclusion from learning data is not performed particularly.

In addition, although an illustration is omitted, learning is performed by using explanatory variables and response variables as pairs, and in a case where an explanatory variable or a response variable is excluded due to implementation of maintenance, the response variable or explanatory variable forming a pair with the aforementioned explanatory variable or response variable needs to be excluded from learning data at the same time.

Next, a method of learning time series changes of an index of the symptom sensing period or the prediction period is explained.

Figure 13:
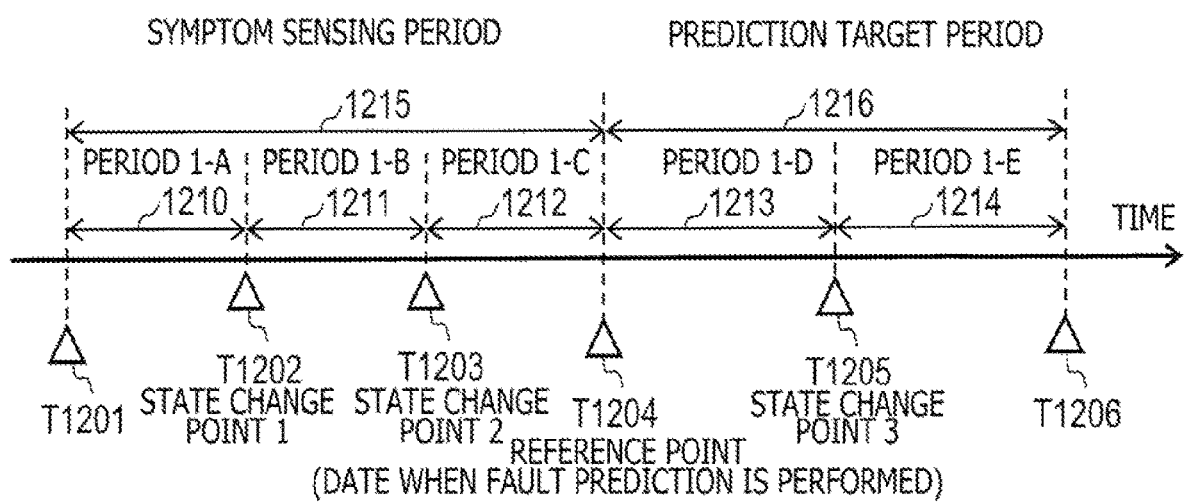
FIG. 13 is a figure for explaining sub-period division of the symptom sensing period and the prediction target period in the fault predicting system illustrated in FIG. 1.

FIG. 13 is a figure for explaining sub-period division of the symptom sensing period and the prediction target period in the fault predicting system illustrated in FIG. 1. Here, sub-period division divides the symptom sensing period or the prediction target period into one or more sub-periods, each sub-periods is given a unique identifier, and machine learning is performed for each sub-period.

In the example illustrated in FIG. 13, a symptom sensing period 1215 indicated as the period from T1201 to T1204 is divided into three symptom-sensing sub-periods, which are a period 1-A 1210 from T1201 to T1202, a period 1-B 1211 from T1202 to T1203 and a period 1-C 1212 from T1203 to T1204, and also a prediction target period 1216 indicated as the period from T1204 to T1206 is divided into two prediction-target sub-periods, which are a period 1-D 1213 from T1204 to T1205 and a period 1-E 1214 from T1205 to T1206.

In this manner, by dividing the symptom sensing period or the prediction target period into a plurality of sub-periods, and performing machine learning using information of individual sub-periods as separate piece of information, it becomes possible to make the fault prediction model reflect changes in how an operation log looks like in the symptom sensing period or the prediction target period, and to enhance the precision of fault prediction. Note that the number of sub-periods to be obtained by dividing a period is not particularly limited to one or more, and also only the symptom sensing period may be divided or only the prediction target period may be divided.

It can be said that in a more desirable configuration, the method of division into sub-periods uses change points of the state of an apparatus, but even with a configuration in which a period is divided simply at constant intervals, the effect of capturing time series changes mentioned below is obtained.

FIG. 14 is a figure for explaining a method of dividing the symptom sensing period and the prediction target period into sub-periods in the fault predicting system illustrated in FIG. 1. (a) illustrates an example in which division is not performed, (b) illustrates an example in which a period is divided into two and (c) illustrates an example in which a period is divided into three. For simplification and convenience, in all of the three cases, the data indicates six discrete occurrences of a particular event 1402 in a target period 1401. Certainly, similar effects can be obtained even if target data is consecutive values like sensor outputs.

Figure 14A:
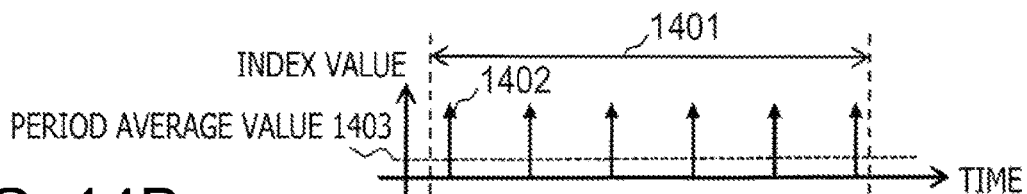
FIGS. 14A to 14C are figures for explaining a method of dividing the symptom sensing period and the prediction target period into sub-periods in the fault predicting system illustrated in FIG. 1.

As illustrated in FIG. 14(a), in a case where the particular event 1402 occurs at constant intervals in the period 1401, the occurrence frequency does not change between before and after the period. Accordingly, this is a case where a time series change does not occur, and only the probability of occurrence of the event should be observed. Because of this, period division is not performed at the fault-model learning section 107.

Figure 14B:
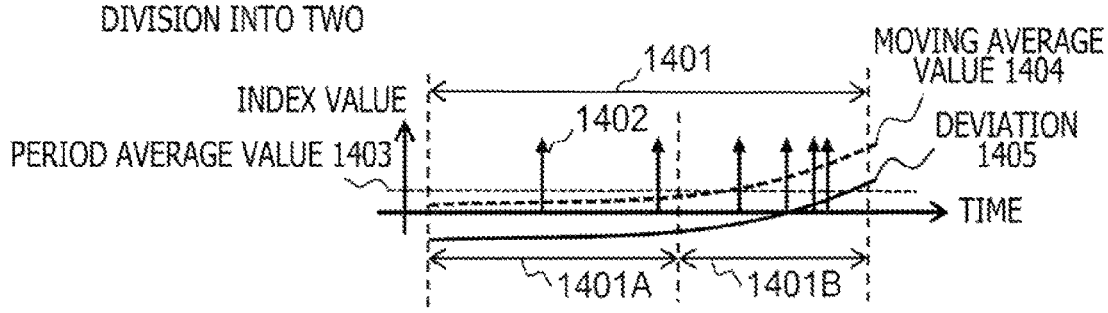

In addition, as illustrated in FIG. 14(b), in a case where the occurrence frequency of the particular event 1402 gradually increases in the period 1401, the moving average value 1404 exhibits an increase in the inclination as it gets closer to the second half of the period, and to the end of the period. At this time, the deviation 1405 acquired by subtracting the moving average value from the overall average value 1403 of the period 1401 is a negative value in the first half of the period and a positive value in the second half of the period. Because of this, by dividing the period into two, Period A 1401A and Period B 1401B, at the time point where the inclination starts increasing, setting period labels as keys for the periods and inputting the periods to machine learning as explanatory variables or response variables, it is possible to obtain a larger value in Period B 1401B or to obtain a smaller value in Period A 1401A, and thereby it can be expected that a model reflecting the extracted feature of the increase of this index can be generated.

Figure 14C:
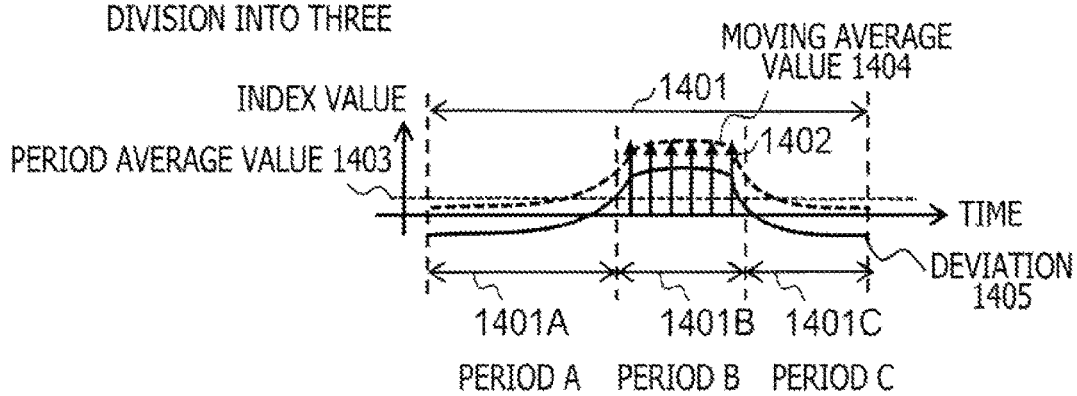

In addition, as illustrated in FIG. 14(c), in a case where the occurrence frequency of the particular event 1402 temporarily increases in the period 1401, the moving average value 1404 exhibits an increase in the middle of the period, and exhibits decreases before the start and after the end of the period. At this time, the deviation 1405 acquired by subtracting the moving average value from the overall average value 1403 of the period 1401 is a negative value at time points closer to the start and the end of the period and a positive value in the middle of the period. Because of this, by dividing the period into three, Period A 1401A, Period B 1401B and Period C 1401C, at the time points before and after the temporary increase of the frequency, setting period labels as keys for the periods and inputting the periods to machine learning as explanatory variables or response variables, it is possible to obtain a larger value in Period B 1401B or to obtain a smaller value in Period A 1401A and Period C 1401C, and thereby it can be expected that a model reflecting the extracted feature of the temporary increase in this index can be generated.

Figure 15:
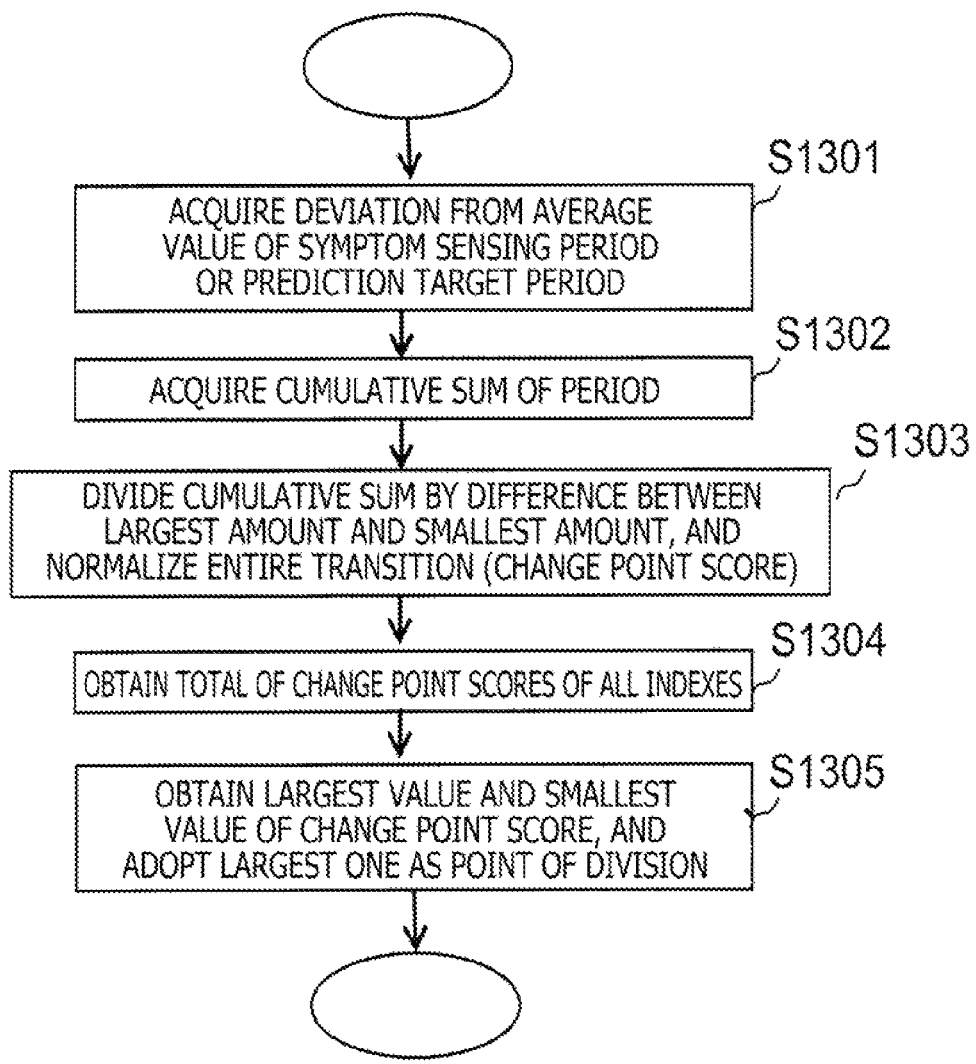
FIG. 15 is a flowchart for explaining a method of dividing the symptom sensing period and the prediction target period into sub-periods at a statistical change point in the fault predicting system illustrated in FIG. 1.

FIG. 15 is a flowchart for explaining the method of dividing the symptom sensing period and the prediction target period into sub-periods at a statistical change point in the fault predicting system illustrated in FIG. 1.

In a case where the symptom sensing period and the prediction target period in the fault predicting system illustrated in FIG. 1 are divided into sub-periods at statistical change points, first, deviations of a target operation log item from the average value of the symptom sensing period or the prediction target period are acquired (Step 1301). Thereby, in the period, portions corresponding to increases are expressed as exhibiting positive values, and portions corresponding to decreases are expressed as exhibiting negative values.

Next, the transition (cumulative sum) obtained by adding together log item values in the period from the start to the end of the period sequentially is acquired (Step 1302). Since the cumulative sum has a positive inclination when the cumulative sum is increasing, and has a negative inclination when the cumulative sum is decreasing, time points when the operation log starts increasing or decreasing are observed as peaks.

Next, in order to total target log items, and obtain apparatus state changes, the transition of the cumulative sum is normalized for each log item (divided by the difference between the largest value and the smallest value) (Step 1303). Thereby, influence of individual log items on the change point score is prevented from becoming imbalanced.

Next, a change point score is obtained for each log item, the cumulative sums of the change point scores are normalized, and the normalized cumulative sums of all the log items are added together (Step 1304).

This cumulative sum obtained by the addition is a change point score in the section, and a positive or negative peak is adopted as a point of division in accordance with the number of sub-periods to be obtained as a result of division (Step 1305). In order to divide the period into a desired number of sub-periods, points of division are decided by extracting peaks of the absolute value of the change point score sequentially from the highest peak.

FIG. 16 is a figure illustrating an example in which period division is implemented by using indexes obtained from an operation log, in which (a) is a figure illustrating the transition of log item values (deviations), and (b) is a figure illustrating the transition of change point scores. Note that in FIG. 16, the horizontal axis indicates date, and the transition from Mar. 19, 2016 until May 28, 2016 is illustrated.

As illustrated in FIG. 16(a), the log item values (deviations) exhibit constant transition from Mar. 19, 2016 until around Apr. 22, 2016, and thereafter all the indexes exhibit increases. Thereafter, from around May 14, the inclinations increase further.

If this is represented by change point scores, as illustrated in FIG. 16(b), it can be known that there is the highest value peak around April 22, and furthermore there is the second peak around May 14 in the total change point score obtained by adding together normalized change point scores. Because of this, in the present embodiment, April 22 and May 14 are decided as points of division, and the period is divided into Period 1-A 1501, Period 1-B 1502 and Period 1-C 1503.

FIG. 17 is a figure illustrating the average values of deviations in individual sections of each log item as an index illustrated in FIG. 16.

As illustrated in FIG. 17, for example, the deviation of Index 1 has a large negative value in the period 1-A, a positive value in the section 1-B and a large positive value in the section 1-C. This indicates that the index 1 has the tendency of increase in this period. On the other hand, the deviation average value of Index 3 does not exhibit a large change in any of the periods, and it is indicated that this index has the tendency of neither increase nor decrease in this period.

In this manner, by dividing the symptom sensing period and the prediction target period into a plurality of periods at statistical change points which are predetermined change points of feature quantities that are obtained by eliminating noises or errors from operation log information and performing a statistical process of taking out objective feature quantities on the operation log information, a favorable fault prediction model can be obtained, and the fault prediction precision can be enhanced. Note that in one possible manner, the symptom sensing period or the prediction target period is divided into a plurality of periods not at statistical change points, but at fault-occurrence time points or maintenance-implementation time points.

As mentioned above, in the present embodiment, by performing machine learning taking into consideration period-lengths from symptoms until fault occurrences, a fault prediction model reflecting variations among periods from symptoms until fault occurrences can be created, and it becomes possible to enhance the precision of fault prediction.

DESCRIPTION OF REFERENCE CHARACTERS 101-1 to 101-n: Apparatus
104: Fault/maintenance record
105: Apparatus-operation-log recording section
106: Fault/maintenance-record storage section
107: Fault-model learning section
109: Fault predicting section
111: Determining section

The invention claimed is:

1. A fault predicting system comprising:
a storage apparatus that stores data in such a manner that the data can be overwritten and read out; and
a processor that executes software program processing by using the data recorded in the storage apparatus, wherein
the storage apparatus stores
operation log information including a past operational state of a prediction target apparatus, and
fault record information including a fault content and a fault-occurrence date/time related to a fault having occurred in the prediction target apparatus in a past, and
the processor
sequentially changes a reference time point which is equivalent to a fault-prediction-execution time point
by setting, as a symptom sensing period, a period from a time point which is a predetermined first period-length before the reference time point until the reference time point, and
by setting, as a prediction target period,
a period from the reference time point until a time point which is a predetermined second period-length after the reference time point if a fault does not occur in the period from the reference time point until the time point which is the second period-length after the reference time point, and
a period from the reference time point until a fault-occurrence time point if a fault occurs in the period from the reference time point until the time point which is the second period-length after the reference time point, and
generates a fault prediction model for predicting a fault that occurs in the prediction target apparatus in a future by performing machine learning by
using, as an explanatory variable, a feature quantity based on the operation log information of the symptom sensing period, and
using, as a response variable, a fault index value based on
whether or not there is a particular-event occurrence in the operation log information corresponding to a fault occurrence in the fault record information of the prediction target period, and
a period-length from the reference time point until the fault-occurrence time point, wherein
the machine learning is performed repetitively over a plurality of staggered and/or overlapping periods, each comprising the symptom sensing period, the prediction target period, and the sequentially changed reference time points.

2. The fault predicting system according to claim 1, wherein the fault index value includes a coefficient which is a value according to the period-length from the reference time point until the fault-occurrence time point.

3. The fault predicting system according to claim 2, wherein
the fault index value is computed by multiplying a particular-event occurrence probability by the coefficient.

4. The fault predicting system according to claim 1, wherein
the processor divides the symptom sensing period into a plurality of symptom-sensing sub-periods, and performs the machine learning by using operation log information of each of the symptom-sensing sub-periods as a separate piece of information.

5. The fault predicting system according to claim 4, wherein
the processor divides the symptom sensing period into the symptom-sensing sub-periods at a statistical change point which is a predetermined change point of the feature quantity obtained by statistically processing the operation log information.

6. The fault predicting system according to claim 4, wherein
the processor divides the symptom sensing period into the symptom-sensing sub-periods at the fault-occurrence time point in the fault record information.

7. The fault predicting system according to claim 4, wherein
a maintenance-implementation time point at which maintenance has been implemented in response to the fault is recorded in the fault record information, and
the processor divides the symptom sensing period into the symptom-sensing sub-periods at the maintenance-implementation time point in the fault record information.

8. The fault predicting system according to claim 4, wherein
a maintenance-implementation time point at which maintenance has been implemented in response to the fault is recorded in the fault record information, and
the processor excludes, in the machine learning, operation log information of a symptom-sensing sub-period including the maintenance-implementation time point in the fault record information.

9. The fault predicting system according to claim 1, wherein
the processor divides the prediction target period into a plurality of prediction-target sub-periods, and performs the machine learning by using the operation log information of each of the prediction-target sub-periods as a separate piece of information.

10. The fault predicting system according to claim 9, wherein
the processor divides the prediction target period into the prediction-target sub-periods at a statistical change point which is a predetermined change point of the feature quantity obtained by statistically processing the operation log information.

11. The fault predicting system according to claim 9, wherein
the processor divides the prediction target period into the prediction-target sub-period at the fault-occurrence time point in the fault record information.

12. The fault predicting system according to claim 9, wherein
a maintenance-implementation time point at which maintenance has been implemented in response to the fault is recorded in the fault record information, and
the processor divides the prediction target period into the prediction-target sub-periods at the maintenance-implementation time point in the fault record information.

13. The fault predicting system according to claim 9, wherein
a maintenance-implementation time point at which maintenance has been implemented in response to the fault is recorded in the fault record information, and
the processor excludes, in the machine learning, operation log information of a prediction-target sub-period including the maintenance-implementation time point in the fault record information.

14. A fault prediction method performed by a computer having:
a storage apparatus that stores data in such a manner that the data can be overwritten and read out; and
a processor that executes software program processing by using the data recorded in the storage apparatus, the method comprising:
by the storage apparatus, storing operation log information including a past operational state of a prediction target apparatus, and fault record information including a fault content and a fault-occurrence date/time related to a fault having occurred in the prediction target apparatus in a past, and
by the processor,
sequentially changing a reference time point which is equivalent to a fault-prediction-execution time point
by setting, as a symptom sensing period, a period from a time point which is a predetermined first period-length before the reference time point until the reference time point, and
by setting, as a prediction target period,
a period from the reference time point until a time point which is a predetermined second period-length after the reference time point if a fault does not occur in the period from the reference time point until the time point which is the second period-length after the reference time point, and
a period from the reference time point until a fault-occurrence time point if a fault occurs in the period from the reference time point until the time point which is the second period-length after the reference time point, and
generating a fault prediction model for predicting a fault that occurs in the prediction target apparatus in a future by performing machine learning by using, as an explanatory variable, a feature quantity based on the operation log information of the symptom sensing period, and
using, as a response variable, a fault index value based on whether or not there is a particular-event occurrence in the operation log information corresponding to a fault occurrence in the fault record information of the prediction target period, and a period-length from the reference time point until the fault-occurrence time point, wherein
the machine learning is performed repetitively over a plurality of staggered and/or overlapping periods, each comprising the symptom sensing period, the prediction target period, and the sequentially changed reference time points.

15. The fault prediction method according to claim 14, wherein
the fault index value includes a coefficient which is a value according to the period-length from the reference time point until the fault-occurrence time point.

16. The fault prediction method according to claim 14, wherein
the processor divides the symptom sensing period into a plurality of symptom-sensing sub-periods, and performs the machine learning by using operation log information of each of the symptom-sensing sub-periods as a separate piece of information.

17. The fault prediction method according to claim 14, wherein
the processor divides the prediction target period into a plurality of prediction-target sub-periods, and performs the machine learning by using the operation log information of each of the prediction-target sub-periods as a separate piece of information.

* * * * *